(12) United States Patent
Kahrizi et al.

(10) Patent No.: US 8,862,064 B2
(45) Date of Patent: Oct. 14, 2014

(54) SELF-TESTING TRANSCEIVER ARCHITECTURE AND RELATED METHOD

(75) Inventors: Masoud Kahrizi, Irvine, CA (US); Zhimin Zhou, Rancho Palos Verdes, CA (US); Hooman Darabi, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 259 days.

(21) Appl. No.: 12/924,353

(22) Filed: Sep. 24, 2010

(65) Prior Publication Data

US 2012/0077446 A1 Mar. 29, 2012

(51) Int. Cl.
H04B 17/00 (2006.01)

(52) U.S. Cl.
CPC .......... *H04B 17/0027* (2013.01); *H04B 17/001* (2013.01)
USPC .......................... 455/67.11; 455/73; 455/126

(58) Field of Classification Search
CPC ................................................... H04B 17/0027
USPC ........................................ 455/67.11, 73, 126
See application file for complete search history.

(56) References Cited

U.S. PATENT DOCUMENTS

| | | | |
|---|---|---|---|
| 3,652,948 | A | 3/1972 | Fierstien |
| 4,591,795 | A | 5/1986 | McCorkle |
| 4,701,722 | A | 10/1987 | Dolby |
| 4,706,262 | A | 11/1987 | Ohta |
| 4,904,921 | A | 2/1990 | DeVito |
| 5,089,716 | A | 2/1992 | Wallis |
| 5,241,694 | A | 8/1993 | Vaeis |
| 5,432,473 | A | 7/1995 | Mattila |
| 5,530,923 | A | 6/1996 | Heinonen |
| 5,606,285 | A | 2/1997 | Wang |
| 5,697,074 | A | 12/1997 | Makikallio |
| 5,777,468 | A | 7/1998 | Maher |
| 6,046,641 | A | 4/2000 | Chawla |
| 6,606,359 | B1 | 8/2003 | Nag |
| 6,864,808 | B2 | 3/2005 | McBrien |
| 6,900,693 | B2 | 5/2005 | Sasho |
| 7,305,041 | B2 | 12/2007 | Anvari |
| 7,471,935 | B2 | 12/2008 | Barak |
| 7,477,187 | B2 | 1/2009 | Rofougaran |
| 7,477,875 | B2 | 1/2009 | Zhang |
| 7,539,466 | B2 | 5/2009 | Tan |
| 8,260,227 | B2 | 9/2012 | Chiu |

(Continued)

OTHER PUBLICATIONS

Chinese Office Action dated Aug. 27, 2013.

*Primary Examiner* — Hsin-Chun Liao
(74) *Attorney, Agent, or Firm* — Oblon, Spivak, McClelland, Maier & Neustadt, L.L.P.

(57) ABSTRACT

A self-testing transceiver comprises a receiver, and a transmitter including a power amplifier (PA) and a plurality of transmitter pre-PA stages. The plurality of transmitter pre-PA stages are configured to generate a communication signal at a receive frequency of the transceiver and the receiver is configured to process another communication signal at a transmit frequency of the transceiver, thereby enabling transceiver self-testing. A method for use by a transceiver for self-testing comprises generating a first communication signal at a transmit frequency of the transceiver by a transmitter of the transceiver, processing the first communication signal by a receiver of the transceiver, generating a second communication signal at a receive frequency of the transceiver by the transmitter, and processing the second communication signal by the receiver. The described generating and processing of the first and second communication signals resulting in self-testing by the transceiver.

19 Claims, 4 Drawing Sheets

(56) References Cited

U.S. PATENT DOCUMENTS

| | | |
|---|---|---|
| 8,311,155 B2 | 11/2012 | Umeda |
| 2004/0166821 A1* | 8/2004 | Varra et al. ................. 455/240.1 |
| 2005/0118966 A1 | 6/2005 | Anvari |
| 2006/0009174 A1 | 1/2006 | Dunn |
| 2006/0105723 A1 | 5/2006 | Anvari |
| 2006/0164159 A1* | 7/2006 | Kimura ......................... 327/552 |
| 2006/0217085 A1* | 9/2006 | Eisenstadt et al. ............ 455/126 |
| 2007/0298731 A1* | 12/2007 | Zolfaghari ...................... 455/91 |
| 2009/0073070 A1 | 3/2009 | Rofougaran |
| 2010/0090760 A1 | 4/2010 | Bachmann |
| 2010/0159856 A1 | 6/2010 | Kato |
| 2010/0266066 A1 | 10/2010 | Takahashi |
| 2011/0227649 A1* | 9/2011 | Montalvo ...................... 330/254 |
| 2012/0046004 A1 | 2/2012 | Mirzaei |
| 2012/0052824 A1 | 3/2012 | Mirzaei |

\* cited by examiner

SELF-TESTING TRANSCEIVER ARCHITECTURE AND RELATED METHOD

BACKGROUND OF THE INVENTION

1. Field of the Invention

The present invention is generally in the field of electronic circuits and systems. More specifically, the present invention is in the field of communications circuits and systems.

2. Background Art

Transceivers are typically used in communications systems to support both transmission and reception of communication signals through a common antenna, for example, at radio frequency (RF) in a cellular telephone or other mobile communications to device. A conventional receiver implemented as part of a transceiver typically utilizes several stages to amplify and process a receive signal in a predetermined RF reception frequency range. In the receiver "front-end," for example, a low noise amplifier (LNA) may be used to boost the receive signal prior to down-conversion from RF to baseband by a mixer stage. In a conventional receiver "back-end," the baseband signal is then filtered by a high-order low-pass filter (LPF) providing substantial additional gain control in the conventional receiver design. Moreover, a transmitter implemented in such a conventional transceiver typically utilizes several processing stages configured using an open-loop design to condition and preamplify a transmit signal prior to passing the transmit signal to a power amplifier (PA).

As consumer demand for ever smaller, more powerful, and more inexpensive mobile communications devices increases, strategies are continuously being sought to make transceiver production less costly and more efficient. Traditionally, those strategies have focused primarily on increasing circuit integration and other approaches that reduce the physical measurables characterizing the transmitter and/or receiver implemented in the transceiver system. However, in addition to layout and dimensional factors, another source of cost in transceiver fabrication flows from conventional approaches to performing system testing and calibration. For example, conventional factory testing and calibration of a transceiver, that is to say factory testing and calibration of each of the transmitter and receiver subsystems of the transceiver, consumes time and requires the use of dedicated external test equipment. In addition, because the resource requirements imposed by factory testing and calibration may be largely independent of the technology to node utilized for transceiver fabrication, those requirements for testing time and test equipment utilization typically do not scale with dimensional reductions, making conventional factory testing and calibration an increasingly significant limitation on production cost-effectiveness.

Thus, there is a need to overcome the drawbacks and deficiencies in the art by providing a self-testing transceiver architecture suitable for implementation as part of a mobile device transceiver.

SUMMARY OF THE INVENTION

The present invention is directed to a self-testing transceiver architecture and related method, substantially as shown in and/or described in connection with at least one of the figures, and as set forth more completely in the claims.

DETAILED DESCRIPTION OF THE INVENTION

The present invention is directed to a self-testing transceiver architecture and related method. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention, which use the principles of the present invention are not specifically described in the present application and are not specifically illustrated by the present drawings.

Figure 1:
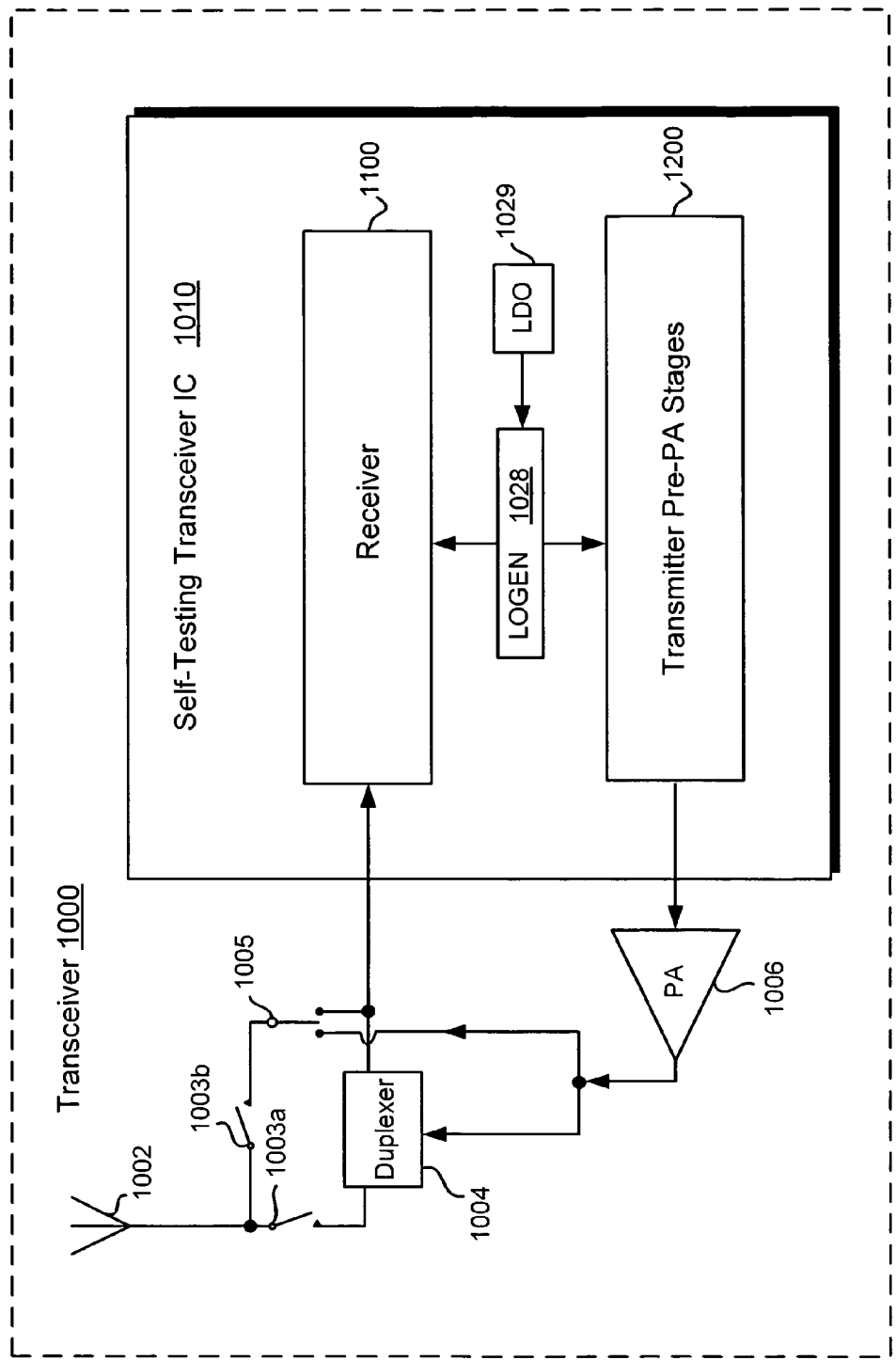
FIG. 1 is a block diagram of a self-testing transceiver, according to one embodiment of the present invention.

FIG. 1 is a block diagram of a self-testing transceiver, according to one embodiment of the present invention, capable of overcoming the drawbacks and deficiencies associated with conventional designs. Referring to FIG. 1, as shown in that figure, self-testing transceiver 1000 comprises antenna 1002, transceiver input/output routing switches 1003a and 1003b, duplexer 1004, transmit/receive (T/R) switch 1005, power amplifier (PA) 1006, and self-testing transceiver integrated circuit (IC) 1010. As further shown in FIG. 1, self-testing transceiver IC 1010 includes receiver 1100, transmitter pre-PA stages 1200, local oscillator generator (LOGEN) 1028 configured to feed mixer circuits internal to receiver 1100 and transmitter pre-PA stages 1200 (mixers not shown in FIG. 1), and low-dropout regulator (LDO) 1029 serving as an exemplary power supply for LOGEN 1028. Although not explicitly shown as such in FIG. 1, transmitter pre-PA stages 1200 comprise a plurality of transmit chain processing stages implemented using a closed-loop architecture and configured to provide accurate and efficient digital preamplification gain control.

Self-testing transceiver 1000 may be seen to comprise a receiver portion including receiver 1100 and a transmitter portion including PA 1006 and transmitter pre-PA stages 1200. Self testing transceiver 1000 may be implemented in, for example, a wireless communications device, a cellular telephone, a Bluetooth enabled device, a computer, a satellite set-top box, an RF transceiver, a personal digital assistant (PDA), or in any other kind of system, device, component or module utilized as a transceiver in modern electronics applications. As a more specific example, self-testing transceiver 1000 may be utilized in a cellular telephone or other mobile device communicating at radio frequency (RF), such as in a frequency range from approximately 0.8 GHz to approximately 2.2 GHz.

As will be explained in greater detail by reference to FIGS. 2, 3, and 4, in one embodiment, LOGEN 1028 can be configured to extend the respective ranges of the mixer circuits internal to receiver 1100 and transmitter pre-PA stages 1200 so as to enable transmitter pre-PA stages 1200 to generate communication signals at a receive frequency of self-testing transceiver 1000 and so as to enable receiver 1100 to process communication signals at a transmit frequency of self-testing transceiver 1000. As a result, and by virtue of the isolation provided by duplexer 1004 and T/R switch 1005, transmitter pre-PA stages 1200 can be used to test receiver 1100, while receiver 1100 can be used to test the operation of transmitter pre-PA stages 1200, thereby enabling self-testing by transceiver 1000.

Figure 2:
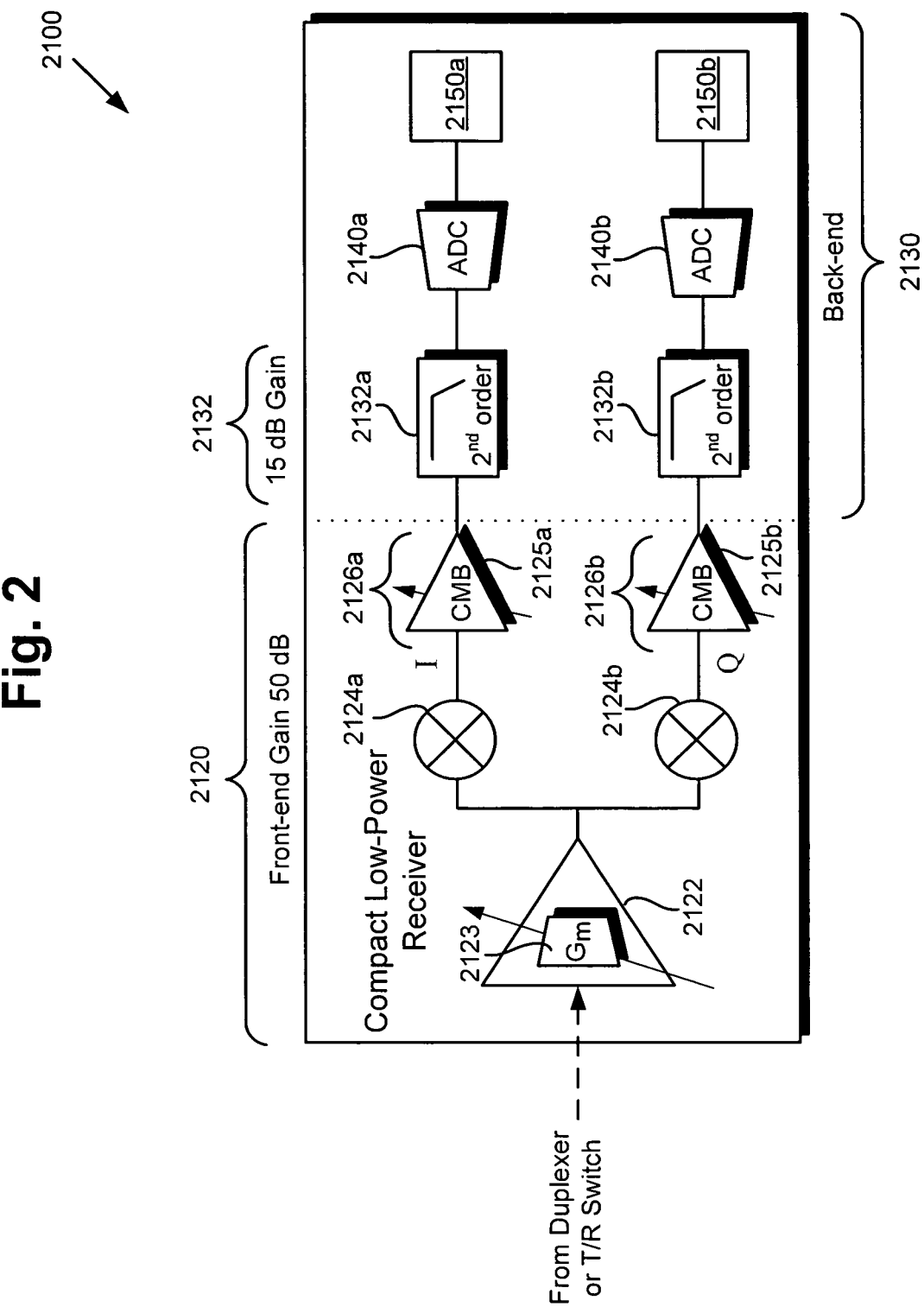
FIG. 2 is a block diagram of a compact low-power receiver architecture suitable for implementation in the self-testing transceiver shown in FIG. 1, according to one embodiment of the present invention.

Turning now to FIG. 2, FIG. 2 is a block diagram of a compact low-power receiver architecture suitable for implementation in self-testing transceiver 1000, shown in FIG. 1, according to one embodiment of the present invention. Compact low-power receiver 2100, in FIG. 2, corresponds to receiver 1100, in FIG. 1. Compact low-power receiver 2100 includes receiver front-end 2120 and receiver back-end 2130. As shown in FIG. 2, receiver front-end 2120 includes low noise amplifier (LNA) 2122 including adjustable transconductance amplifier 2123 configured to provide digital gain control, mixers 2124a and 2124b working in conjunction with, respectively, in-phase (I) and quadrature-phase (Q) signals provided by a local oscillator (such as LOGEN 1028, in FIG. 1), and transimpedance amplifiers (TIAs) 2126a and 2126b including respective current mode buffers 2125a and 2125b. As also shown in FIG. 2, receiver back-end 2130 includes second-order low-pass filters ($2^{nd}$-order LPFs) 2132a and 2132b, analog-to-digital converters (ADCs) 2140a and 2140b, and digital processors 2150a and 2150b, to perform back-end processing of the respective I and Q signal components.

As indicated by FIG. 2, the embodiment of the present invention shown in that figure produces a substantial majority of the overall gain provided by compact low-power receiver 2100 in the form of front-end gain. That is to say, receiver front-end 2120 is configured to contribute 50 dB of the overall receiver gain, while receiver back-end LPF stage 2132 comprising $2^{nd}$-order LPFs 2132a and 2132b is relied upon for a substantially smaller gain contribution, e.g., approximately 15 dB of gain. Consequently, the front-end gain produced by compact low-power receiver 2100 may be approximately two times greater than the back-end gain produced by compact low-power receiver 2100, or even more.

For example, by utilizing LNA 2122 including adjustable transconductance amplifier 2123 to provide digital gain control prior to down-conversion of a receive signal, and TIAs 2126a and 2126b including respective current mode buffers 2125a and 2125b to provide additional gain control to amplify the down-converted signals, the embodiment of FIG. 2 boosts the front-end gain of compact low-power receiver 2100 compared to that of conventional receiver designs. The increase in front-end gain provided by compact low-power receiver 2100 reduces the reliance on back-end gain in embodiments of the present invention. That outcome, in turn, relaxes the noise requirement on the LPFs used for filtering in receiver back-end 2130. Consequently, $2^{nd}$-order LPFs 2132a and 2132b can be implemented in receiver back-end 2130.

In marked contrast to the implementation embodied in FIG. 2, in a conventional receiver back-end, the baseband signal is typically filtered by a high-order LPF, for example a $4^{th}$-order or $5^{th}$-order LPF, which provides a substantial portion of the overall gain control produced in those conventional receiver design. In such a conventional receiver, for example, the gain control provided by the receiver as a whole may be primarily produced by the receiver back-end, with the high-order LPF contributing a significant portion of that gain. Moreover, due to the stringent requirements imposed on the high-order LPFs used in conventional receiver designs, those features typically consume much of the power and dominate most of the area required to implement the receiver.

As communications technologies move toward ever smaller device sizes and adopt ever lower power consumption constraints, as represented by the 40 nm technology node, for example, the relative bulk and high power consumption of conventional receiver architectures becomes increasingly undesirable. By eliminating that conventional reliance on back-end gain, embodiments of the present invention are able to implement a receiver that is both compact, e.g., requires less circuit area for implementation, and consumes less power than conventional designs. Thus, as shown in FIG. 1, in one embodiment, a compact low-power receiver, e.g., receiver 1100, can be integrated with transmitter pre-PA stages 1200, LOGEN 1028 and LDO 1029 onto self-testing transceiver IC 1010 fabricated on a single semiconductor die, using a 40 nm process technology, for example.

Figure 3:
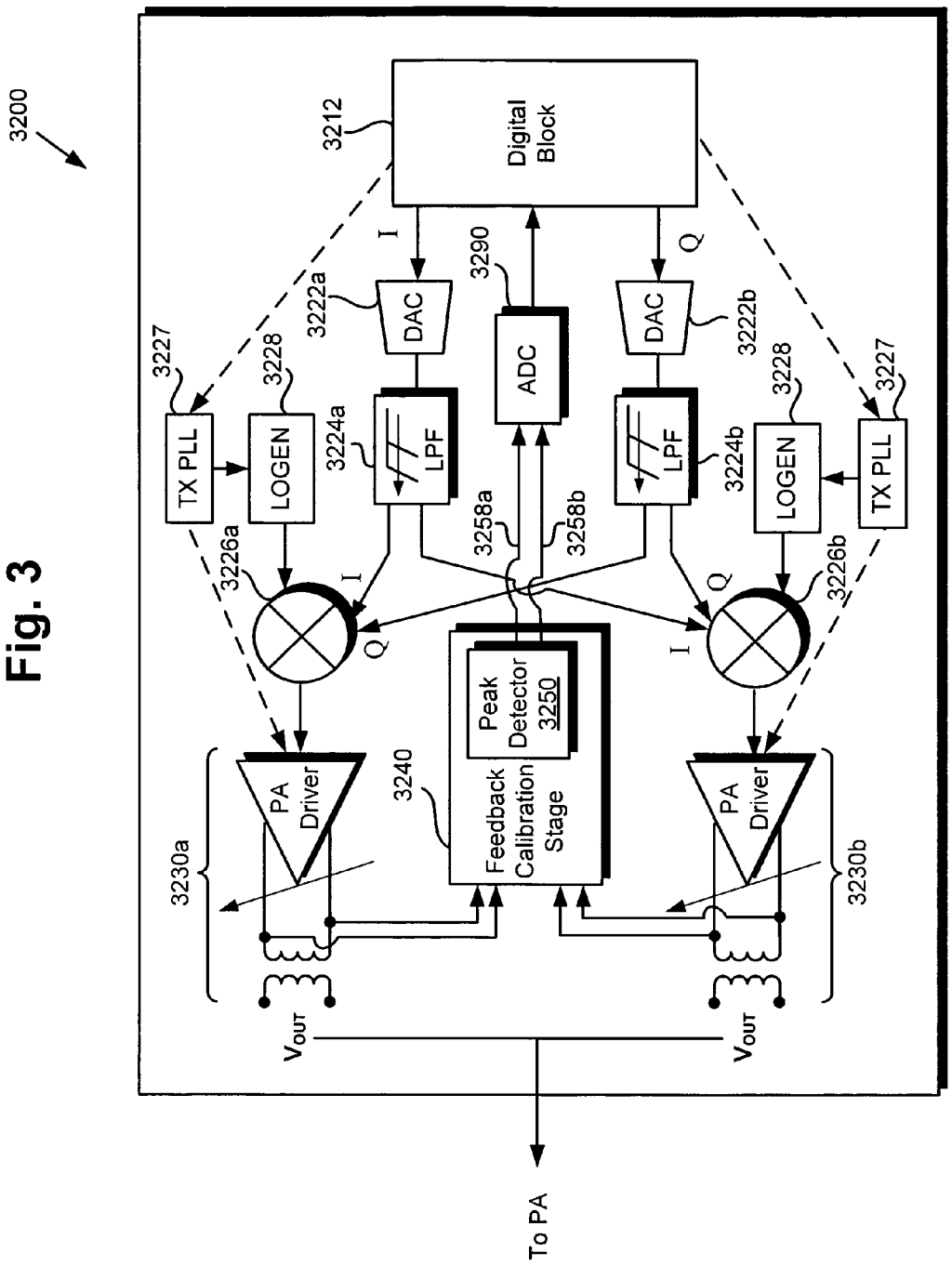
FIG. 3 is a block diagram showing transmitter pre-power amplifier (pre-PA) stages enabling efficient preamplification gain control and suitable for implementation in the self-testing transceiver shown in FIG. 1, according to one embodiment of the to present invention.

Referring to FIG. 3, FIG. 3 is a block diagram showing transmitter pre-PA stages 3200 enabling efficient digital preamplification gain control and suitable for implementation in self-testing transceiver 1000, shown in FIG. 1, according to one embodiment of the present invention. Transmitter pre-PA stages 3200, in FIG. 3, correspond to transmitter pre-PA stages 1200, in FIG. 1, and together with PA 1006 in that previous figure, is comprised by the transmitter portion of self-testing transceiver 1000.

As may be seen from FIG. 3, transmitter pre-PA stages 3200, and thus self-testing transceiver 1000 as a whole, may be configured to support multiple transmission modes and/or multiple transmission frequencies. For example, transmitter pre-PA stages 3200 can be configured to support high-band transmission frequencies in a range between approximately 1.8 GHz and 2.2 GHz, as well as low-band transmission frequencies ranging between approximately 0.8 GHz and 1.1 GHz.

As shown in FIG. 3, transmitter pre-PA stages 3200 include a front-end comprising digital block 3212 providing I and Q output signals to respective digital-to-analog converters (DACs) 3222a and 3222b. As further shown in FIG. 3, transmitter pre-PA stages 3200 include adjustable LPFs 3224a and 3224b. To support high-band frequency channels as well as low-band frequency channels, transmitter pre-PA stages 3200 include respective high-band mixer 3226a and low-band mixer 3226b, which may be implemented as passive circuits, for example. In addition, transmitter pre-PA stages 3200 include high-band variable gain control PA driver 3230a and low-band variable gain control PA driver 3230b providing a preamplified transmit signal to the PA (PA not explicitly shown in FIG. 3).

Also shown in FIG. 3 are transmitter phase-locked loop (TX PLL) 3227 and LOGEN 3228, as well as feedback calibration stage 3240 including peak detector 3250 and analog-to-digital converter ADC 3290 providing digital calibration feedback to digital block 3212. Although TX PLL 3227 and LOGEN 3228 are shown in duplicate in FIG. 3 for the purposes illustrative clarity, in practice, a single combination of TX PLL 3227 and LOGEN 3228 can be coupled to both variable gain control PA drivers 3230a and 3230b, and can be shared by respective high-band and low-band mixers 3226a and 3226b as well. Moreover, in one embodiment, LOGEN 3228 may be further shared by a receiver, such as receiver 1100, in FIG. 1, and thus may be seen to correspond to LOGEN 1028 in that previous figure. As may be apparent from FIG. 3, transmitter pre-PA stages 3200 implement preamplification gain control using a closed-loop architecture represented by feedback to digital block 3212 via feedback calibration stage 3240. Moreover, transmitter pre-PA stages 3200 are configured to provide digital gain control, wherein at least approximately 80 dB of the digital preamplification gain control may be provided by each of variable gain control PA drivers 3230a and 3230b.

As mentioned above, the embodiment of FIG. 3 may be implemented to support multiple communication modes. For example, in one embodiment, a self-testing transceiver including transmitter pre-PA stages 3200 can be configured to support Wideband Code Division Multiple Access (W-CDMA) mode, Global System for Mobile communications (GSM) mode, and Enhanced data rates for GSM Evolution (EDGE) mode communications. Consequently, transmitter pre-PA stages 3200 can be configured to selectably support multiple communication modes providing voice-band and data-band communications when implemented as part of a self-testing transceiver, e.g., self-testing transceiver 1000, in FIG. 1.

Thus, transmitter pre-PA stages 3200, and more generally self-testing transceiver 1000, can be configured to support communication modes employing quadrature modulation schemes as well as communication modes employing polar modulation, for example. For instance, in FIG. 3, transmission modes employing quadrature modulation can be associated with the solid line signal paths linking I and Q outputs of digital block 3212 to variable gain control PA drivers 3230a and 3230b through respective DAC/adjustable LPF/mixer combinations 3222ab/3224ab/3226a and 3222ab/3224ab/3226b. Analogously, transmission modes employing polar modulation can be associated with the dashed line signal paths linking digital block 3212 to variable gain control PA drivers 3230a and 3230b through TX PLL 3227.

It is noted that although the transmitter pre-PA signal paths shown in FIG. 3 are represented by single lines for simplicity, many of those signals can comprise paired differential signals. Thus, the I and Q outputs of digital block 3212 passed to mixers 3226a and 3226b, the outputs of mixers 3226a and 3226b, and the polar mode outputs of digital block 3212 passed to variable gain control PA drivers 3230a and 3230b through TX PLL 3227, and the feedback calibration signal returned to digital block 3212 by ADC 3290, for example, can comprise differential signals. It is further noted that the signal paths internal to variable gain control PA drivers 3230a and 3230b, as well as the feedback signals provided by those variable gain control PA drivers to feedback calibration stage 3240 and the outputs 3258a and 3258b of peak detector 3250, are explicitly shown as differential signals.

As further shown in FIG. 3, the I and Q signal paths provided by respective DACs 3222a and 3222b and adjustable LPFs 3224a and 3224b can be shared between the high-band and low-band transmission signals. Moreover, digital block 3212, TX PLL 3227, LOGEN 3228, feedback calibration stage 3240 including peak detector 3250, ADC 3290, and the PA (not shown in FIG. 3) may be shared in common by all transmission modes and all transmission frequency bands. Consequently, the transmitter including transmitter pre-PA stages 3200 is characterized by a compact space saving architecture that may be particularly well suited to meet increasingly fine dimensional and lower power consumption constraints as fabrication technologies transition to the 40 nm node, for example, and beyond.

The operation of self-testing transceiver 1000, in FIG. 1, will now be further described by reference to FIG. 4, which presents flowchart 400 describing one embodiment of a method for use by a transceiver configured to perform self-testing. Certain details and features have been left out of flowchart 400 that are apparent to a person of ordinary skill in the art. For example, a step may comprise one or more sub-steps or may involve specialized equipment or materials, as known in the art. While steps 410 through 440 indicated in flowchart 400 are sufficient to describe one embodiment of the present invention, other embodiments of the invention may utilize steps different from those shown in flowchart 400, or may comprise more, or fewer, steps.

Step 410 of flowchart 400 comprises generating a communication signal at a transmit frequency of a transceiver by the transceiver transmitter. Referring to FIG. 3, step 410 may be seen to correspond to the functionality provided by transmitter pre-PA stages 3200. For example, and as described above, transmitter pre-PA stages 3200 can be configured to generate a high-band transmit frequency communication signal in a frequency range between approximately 1.9 GHz and 2.2 GHz, for example, or a low-band transmit frequency communication signal in a frequency range between approximately 0.8 GHz and 1.1 GHz.

Figure 4:
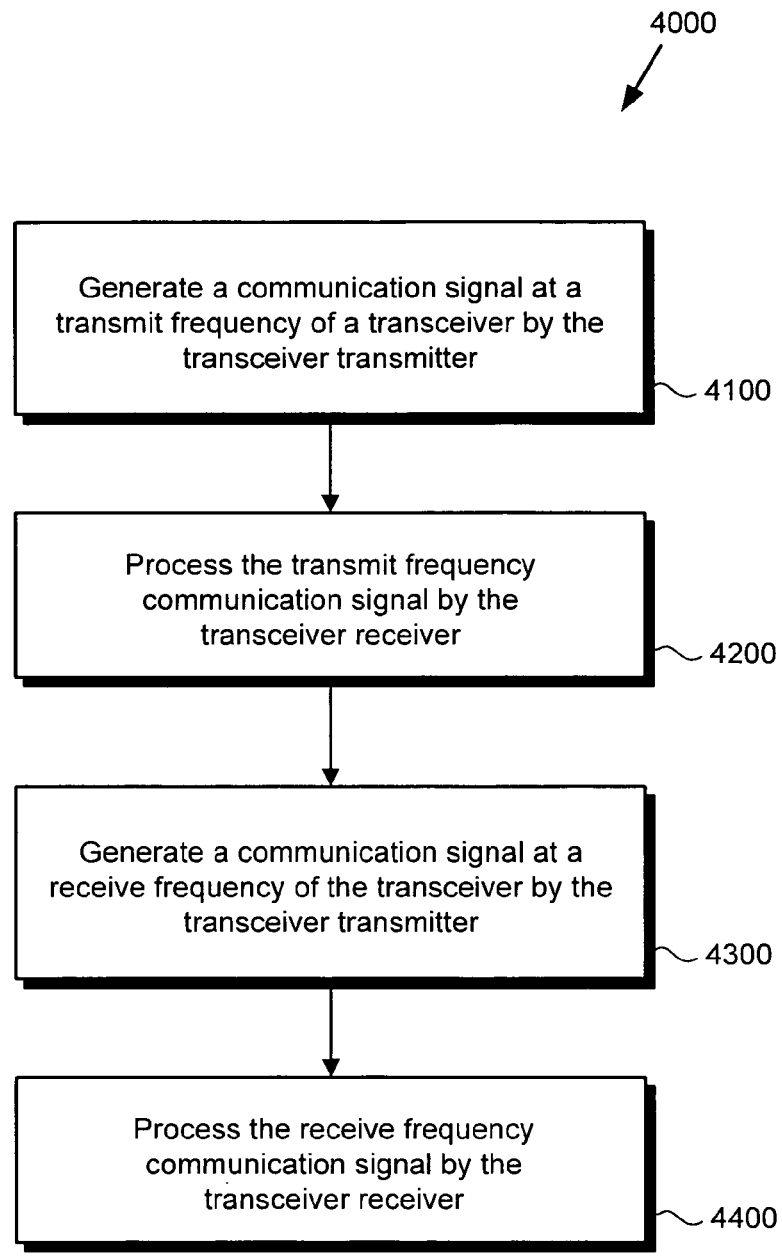
FIG. 4 is a flowchart presenting a method for use by a transceiver configured to perform self-testing, according to one embodiment of the present invention.

Continuing with step 420 in FIG. 4, step 420 of flowchart 400 comprises processing the transmit frequency communication signal generated in step 410 by the transceiver receiver. Referring to FIG. 1, step 420 can be performed by receiver 1100 with the assistance of LOGEN 1028. That is to say, referring now to FIG. 2 as well as FIG. 1, that the frequency range of the signal fed by LOGEN 1028 to mixers 2124a and 2124b can be extended include transmit as well as receive frequencies, thereby enabling compact low-power receiver 2100 to process, e.g., effectively "receive", the communication signal generated by transmitter pre-PA stages 3200 in step 410.

Moving to step 430 of FIG. 4, step 430 of flowchart 400 comprises generating a communication signal at a receive frequency of the transceiver by the transceiver transmitter. Referring to FIG. 3, as was true for step 410, step 430 may be performed by transmitter pre-PA stages 3200. For example, for operation in a quadrature modulation communication mode, the range of frequencies fed by LOGEN 3228 to mixers 3226a and 3226b can be extended so as to enable transmitter pre-PA stages 3200 to generate, e.g., effectively "transmit," a communication signal at a receive frequency of self-testing transceiver 1000.

Continuing with step 440 of flowchart 400, step 440 of flowchart 400 comprises processing the receive frequency communication signal generated in step 430, by the transceiver receiver. Referring to FIG. 1, step 440 can be performed by receiver 1100, which may be understood to be configured to process receive frequency signals as part of its normal operation. Performance of steps 410 through 440 by self-testing transceiver 1000 results in receiver 1100 being utilized to test the operation of the transmitter portion including transmitter pre-PA stages 1200, as well as transmitter pre-PA stages 1200 being utilized to test the operation of receiver 1100. In other words, the communication signal generating and processing performed through execution of steps 410 through 440 results in self-testing its receiver and transmitter portions by transceiver 1000. Moreover, because transceiver 1000 is configured to be self-testing, less time and dedication of external test equipment is needed for factory testing and calibration, thereby reducing production cost and increasing production efficiency of self-testing transceiver 1000 when compared to the conventional art.

Thus, by implementing a receiver configured to process communication signals at a transmit frequency of a transceiver, embodiments of the present invention enable the such a transceiver to perform self-testing of its transmitter portion. By further configuring the transmitter to generate communication signals at a receive frequency of the transceiver, embodiments of the present invention also enable the transceiver to self-test the operation of its receiver. As a result, a self-testing transceiver is provided that substantially reduces the time and dedication of external test equipment required for factory testing and calibration, thereby enabling efficient and cost effective production of the system.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

The invention claimed is:

1. A self-testing transceiver comprising:
   a receiver including a front-end and a back-end, said front-end including a first amplifier providing digital gain control and outputting an amplified receive signal, a mixer for generating a down-converted signal from said amplified receive signal, and a second amplifier providing gain control for amplifying said down-converted signal to produce a front-end output signal, said back-end including one low-order low-pass filter (LPF), wherein said front-end gain is greater than said back-end gain;
   a transmitter including a power amplifier (PA) and a plurality of transmitter pre-PA stages;
   said plurality of transmitter pre-PA stages configured to generate a communication signal at a receive frequency of said transceiver and said receiver configured to process another communication signal at a transmit frequency of said transceiver, thereby enabling transceiver self-testing.

2. The self-testing transceiver of claim 1, wherein said first amplifier of said front end is a low noise amplifier (LNA) which includes a transconductance amplifier; and
   said second amplifier of said front end is a transimpedance amplifier (TIA).

3. The self-testing transceiver of claim 1, wherein said plurality of transmitter pre-PA stages is implemented using a closed-loop architecture.

4. The self-testing transceiver of claim 1, wherein said plurality of transmitter pre-PA stages is configured to provide digital preamplification gain control.

5. The self-testing transceiver of claim 1, wherein said plurality of transmitter pre-PA stages includes a PA driver configured to provide at least approximately 80 dB of digital preamplification gain control.

6. The self-testing transceiver of claim 1, wherein said receiver and said plurality of transmitter pre-PA stages are implemented as an integrated circuit (IC) fabricated on a single semiconductor die.

7. The self-testing transceiver of claim 1, wherein said self-testing transceiver comprises a radio frequency (RF) transceiver.

8. The self-testing transceiver of claim 1, wherein said self-testing transceiver is a multi-mode transceiver configured to support a plurality of communication modes.

9. The self-testing transceiver of claim 1, wherein said self-testing transceiver is implemented as part of a mobile communications device.

10. The self-testing transceiver of claim 1, wherein the one low-order LPF in the back end of the receiver is a second order LPF, and there no other low pass filters connected in series in the back end of the receiver for each front end output signal received.

11. A method for use by a transceiver for self-testing, said method comprising:
    generating a first communication signal at a transmit frequency of said transceiver by a transmitter of said transceiver;
    processing said first communication signal by a receiver of said transceiver;
    generating a second communication signal at a receive frequency of said transceiver by said transmitter; and
    processing said second communication signal by said receiver; said generating and processing of said first and second communication signals resulting in self-testing by said transceiver;
    wherein said receiver includes a front-end and a back-end, said front-end including a first amplifier providing digital gain control and outputting an amplified receive signal, a mixer for generating a down-converted signal from said amplified receive signal, and a second amplifier providing gain control for amplifying said down-converted signal to produce a front-end output signal, said back-end including one low-order low-pass filter (LPF), wherein said front-end gain is greater than said back-end gain.

12. The method of claim 11, wherein said
    first amplifier of said front end is a low noise amplifier (LNA) which includes a transconductance amplifier; and
    said second amplifier of said front end includes a transimpedance amplifier (TIA).

13. The method of claim 11, wherein said transmitter comprises a power amplifier (PA), and a plurality of transmitter pre-PA stages implemented using a closed-loop architecture.

14. The method of claim 11, wherein said transmitter comprises a plurality of transmitter pre-PA stages configured to provide digital preamplification gain control.

15. The method of claim 11, wherein said transmitter comprises a plurality of transmitter pre-PA stages including a PA driver configured to provide at least approximately 80 dB of digital preamplification gain control.

16. The method of claim 11, wherein said transmitter comprises a plurality of transmitter pre-PA stages, and wherein said receiver and said plurality of transmitter pre-PA stages are implemented as an integrated circuit (IC) fabricated on a single semiconductor die.

17. The method of claim 11, wherein said transceiver comprises a radio frequency (RF) transceiver.

18. The method of claim 11, wherein said transceiver is a multi-mode transceiver configured to support a plurality of communication modes.

19. The method of claim 11, wherein said transceiver is implemented as part of a mobile communications device.

* * * * *

UNITED STATES PATENT AND TRADEMARK OFFICE
CERTIFICATE OF CORRECTION

| | | |
|---|---|---|
| PATENT NO. | : 8,862,064 B2 | |
| APPLICATION NO. | : 12/924353 | |
| DATED | : October 14, 2014 | |
| INVENTOR(S) | : Masoud Kahrizi et al. | |

It is certified that error appears in the above-identified patent and that said Letters Patent is hereby corrected as shown below:

In the Claims,

Column 8, Claim 10, line 12, change "LPF, and there no other low pass filters" to --LPF, and there are no other low pass filters--.

Signed and Sealed this
Nineteenth Day of May, 2015

Michelle K. Lee
*Director of the United States Patent and Trademark Office*